United States Patent [19]
Brown

[11] 4,435,866
[45] * Mar. 13, 1984

[54] PELLEN TRAP FOR BEEHIVES WITH DUAL ENTRANCEWAYS

[76] Inventor: Royden Brown, 4343 E. Keim Dr., Phoenix, Ariz. 85253

[*] Notice: The portion of the term of this patent subsequent to Jul. 6, 1999 has been disclaimed.

[21] Appl. No.: 354,882
[22] Filed: Mar. 4, 1982
[51] Int. Cl.³ ............................................. A01K 47/06
[52] U.S. Cl. ........................................................ 6/4 R
[58] Field of Search ............................ 6/1, 4 R, 12 M

[56] References Cited

U.S. PATENT DOCUMENTS

| | | | |
|---|---|---|---|
| 2,292,110 | 8/1942 | Evans | 6/4 R X |
| 2,566,829 | 9/1951 | France | 6/12 |
| 3,343,186 | 9/1967 | Dunand | 6/1 |
| 3,995,338 | 12/1976 | Kauffeld | 6/4 R |
| 4,007,504 | 2/1977 | West | 6/4 R |
| 4,291,424 | 9/1981 | Angelis | 6/4 R |
| 4,322,861 | 4/1982 | Healy | 6/4 R |
| 4,351,074 | 9/1982 | Robson | 6/4 R X |

FOREIGN PATENT DOCUMENTS 1223455 6/1960 France .
2000008 1/1979 United Kingdom .

OTHER PUBLICATIONS

"The Andes Pollen Trap" by Manuel R. Chepote Malatesta, Jan. 1979, *American Bee Journal.*

Primary Examiner—Robert P. Swiatek
Attorney, Agent, or Firm—Warren F. B. Lindsley

[57] ABSTRACT

A pollen trap for use on honey bee colonies employing a pollen collecting drawer and having a pair of entranceways into the trap, one positioned above and the other below the pollen collecting drawer, with the bees entering the grid structure of the trap from different ends thereof.

10 Claims, 8 Drawing Figures

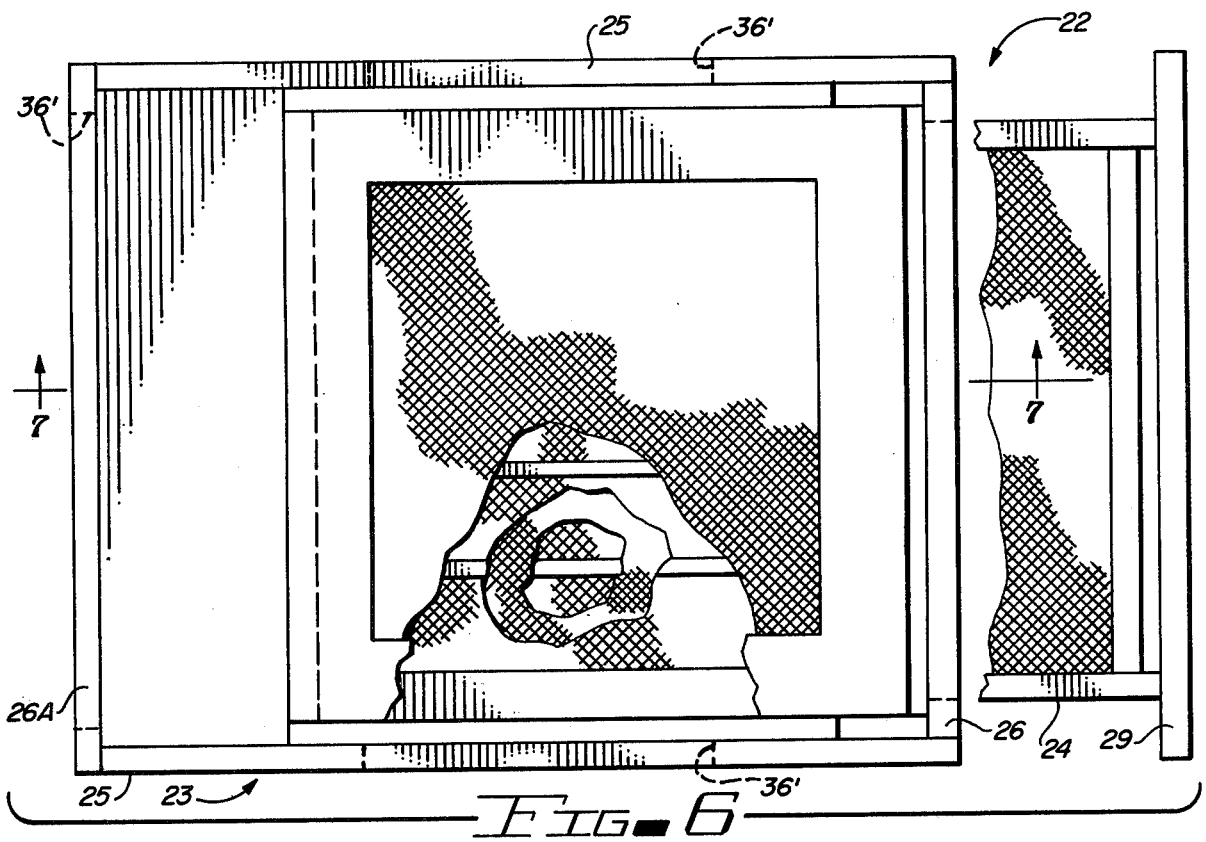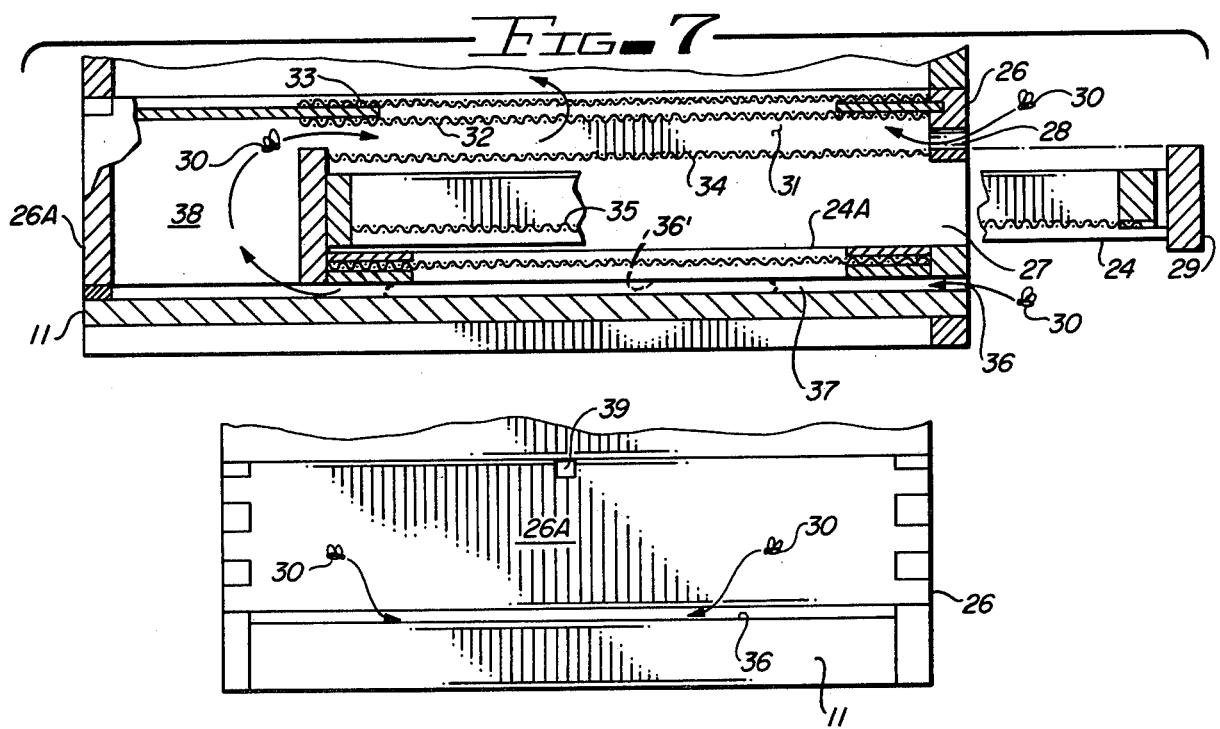

PELLEN TRAP FOR BEEHIVES WITH DUAL ENTRANCEWAYS

BACKGROUND OF THE INVENTION

Floral pollen is the male seed (sperm) of flowers which brings about the fertilization of the plant. This pollen consists of tiny corpuscles, 50/1000ths of a millimeter, and is produced in so-called "anthers" which form the upper part of the "stamens" of a plant. These stamens, which vary in number according to the specie of plant, grow up from the base of the flower as delicate filaments which are broadened into small pads at their free ends. In these pads, the pollen is formed and from these anthers the foraging bees collect their pollen.

The worker bees who collect pollen mold it into a solid mass with a little honey and then attach the resulting kernel to the outer part of their hind legs.

When a pollen collecting worker bee returns to its hive, it stores the pollen in a separate group of cells from the honey inside the honeycombs, to be taken out again when needed.

Since pollen is considered by many the perfect food and by others a diet supplement, it is collected from honey bees by means of pollen traps which are attached to their hives. In many of the prior art uses a grid is placed over the hive entrance so that the bees have to push through it to get into the hive. In doing so the pollen pellets are dislodged from their legs and fall into a trough.

DESCRIPTION OF THE PRIOR ART

Although pollen traps have been placed over the hive entranceways to collect pollen, most of the devices consisted of a single piece of hardware cloth or a piece thereof folded back on itself. If a trash grid is not used, the pollen is contaminated with large amounts of trash, including dead bees accumulated in a pile between the hive entrance and the pollen trap.

Prior art pollen traps that are attached to the entranceways to the hives agitate the bees when the traps are removed and interrupt the flight of the bees into the hives, causing them to gather in front of the hive, often in clusters.

U.S. Patent Application, Ser. No. 223,935, filed by the inventor on this subject matter on Jan. 9, 1981, and entitled Pollen Trap For Beehives, discloses pollen traps having only one entranceway into the grid assembly of the trap.

U.S. Pat. No. 3,995,338 discloses a pollen trap with a cleaning grid mounted on a known beehive. This pollen trap requires the bees to enter the hive through an unfamiliar entranceway.

U.S. Pat. No. 4,007,504 discloses a single grid or screen across the entryway of a hive for controlling the movement of bees into the hive. The screen is intended to loosen pollen on the legs of the bees as they pass therethrough. A container is located below the grid or screen for receiving the pollen falling off of the bees passing therethrough.

French Pat. No. 1,223,455 discloses a drawer employing a grid mounted at a point spaced from the entranceway of the hive and serving as a pollen trap.

Manual R. Chepote Malatesta, in his article published January, 1979, in the *American Bee Journal*, entitled, "The Andes Pollen Trap", discloses the benefits of a double layer wire mesh for removing pollen from the legs of the bees. There is no teaching of mounting this in an easily removable drawer which keeps the pollen from piling up at the entranceway of the hive.

U.S. Pat. No. 2,566,829 discloses a beehive employing means for inducing the bees to deposit all of their surplus propolis into a collection means. This means comprises a particular sash frame having a configuration different than the pollen drawer and does not disclose the particular dual entranceway disclosed herein.

U.S. Pat. No. 3,343,186 discloses a hive having a single entranceway into the structure.

United Kingdom Pat. No. 2,000,008 discloses a beehive designed for ventilative purposes and employs a single bee entranceway.

None of these patents disclose a dual entrance pollen trap which directs the movement of the bees from two different sides of its grid, through the grid and into the beehive.

SUMMARY OF THE INVENTION

In accordance with the invention claimed, a new and improved pollen trap is provided which employs more than one entranceway into the hive and more effectively uses a grid to remove desired amounts of pollen from the legs of the bees. Further, the pollen trap is designed to more effectively ventilate the beehive than heretofore possible with the prior art structures.

It is, therefore, one object of this invention to provide a new and improved pollen trap.

Another object of this invention is to provide a new and improved dual entrance pollen trap for beehives which directs the bees from two different directions to the pollen removing grids.

A further object of this invention is to provide a new and improved dual entrance pollen trap employing a pollen removing grid assembly, the partitions of which the bees use as a ladder to crawl through the grid assembly.

A still further object of this invention is to provide a new and improved pollen trap which fits substantially all existing beehives, increasing its total height merely four and one-half inches.

A still further object of this invention is to provide an improved pollen trap for beehives which may be mounted on the hive so that its pollen drawer may be removed from any side of the colony.

A still further object of this invention is to provide a new and improved frame for a drawer for a pollen trap that supports and houses the grids that trap the pollen from the legs of the bees.

Further objects and advantages of the invention will become apparent as the following description proceeds, and the features of novelty which characterize this invention will be pointed out with particularity in the claims annexed to and forming a part of this invention.

BRIEF DESCRIPTION OF THE DRAWINGS

The present invention may be more readily described by reference to the accompanying drawings in which:

FIG. 6 is a top view, partially broken away, with a partial view of the drawer shown withdrawn of the pollen trap shown in FIG. 5;

FIG. 7 is a cross-sectional view of FIG. 6 taken along the line 7—7; and

FIG. 8 is a modification of the assembly of the pollen drawer shown in FIG. 5 with the second bee entranceway shown on the back side of the pollen trap opposite the drawer.

DESCRIPTION OF THE PREFERRED EMBODIMENT

Figure 1:
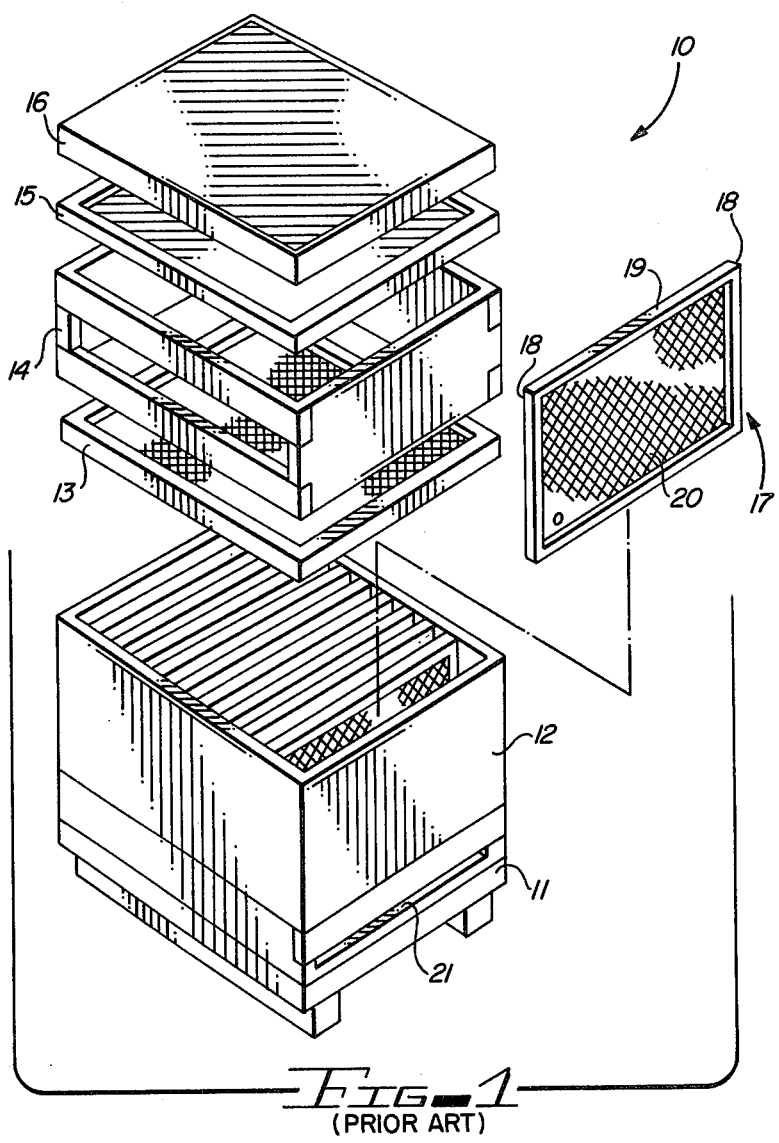
FIG. 1 is a perspective exploded view of a modern beehive.

Referring more particularly to the drawings by characters of reference, FIG. 1 discloses a modern beehive 10 comprising a pallet supported bottom board 11, a brood nest or box 12, a queen excluder 13 comprising a grate mesh formed of wire 0.163 to 0.167 inches apart, one or more honey storage supers 14, an inner cover 15 and a cover or roof 16.

The queen excluder 13 is an important piece of equipment for some beekeepers since it has spaces wide enough so that worker bees may pass through, but the queen and drone bees cannot. If the queen excluder is placed above the brood nest, the queen is confined in that area and cannot lay eggs in the honey storage area of the supers.

The brood nest 12 and super 14, comprising an open-ended rectangular shell, contain a plurality of hanging combs or frames 17. Although ten frames are shown in the brood nest 12 in FIG. 1, many beekeepers use nine frames in the standard hive. The slightly wider spacing makes it easier to remove the combs and to inspect the brood nest.

In the super 14 (the honey storage area), beekeepers use nine frames evenly spaced. By using nine frames in a ten frame beehive, the bees, due to the wider spacing in the super than in the brood nest, draw out the cells making them deeper, thereby easier to uncap by the beekeeper.

There are also eight to twelve frame beehives with smaller or larger brood boxes, respectively. The disclosed pollen traps are built smaller or larger to fit these often called non-standard hives.

Each hanging frame 17 is rectangular in form and designed to leave a bee space all around. Lugs 18 are formed as extensions of the top bar 19 so that the frames can be hung from rebates in the side walls of the brood nest and super or from the built out portions of these parts of the hive. Sheets of wax foundation 20 complete the well-known frame construction.

An entranceway 21 into the beehive is generally formed between the bottom board 11 and the bottom of the brooder box 12, as shown in FIG. 1.

In accordance with the invention claimed, a new and improved pollen trap 22 is added to the modern beehive 10 in such a manner that the young bees in the hive are not stressed, and the flight of bees coming into or leaving the hive is not unduly obstructed.

Figure 2:
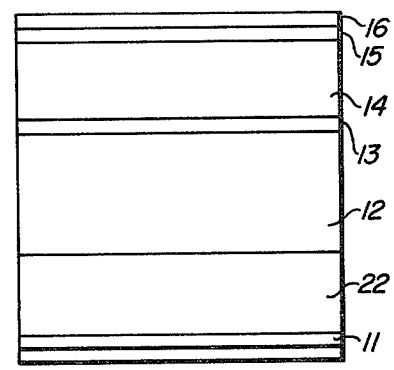
FIG. 2 is a side view of a modification of the beehive shown in FIG. 1 employing the new pollen trap at its base.
Figure 3:
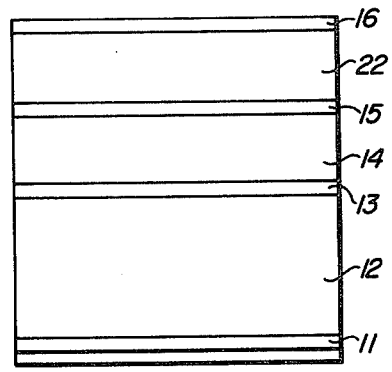
FIG. 3 is a view similar to FIG. 2 showing the novel pollen trap at the top of the beehive.
Figure 4:
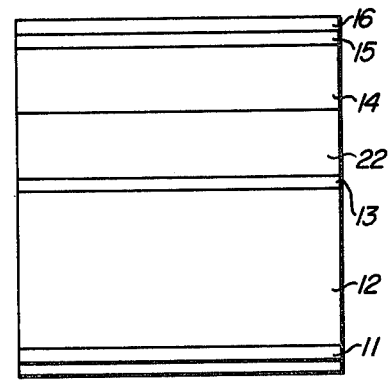
FIG. 4 is a view similar to FIGS. 2 and 3 showing the novel pollen trap in the center of the beehive.

Although the pollen trap 22 is generally mounted on the bottom board 11 and between it and the brood box 12, as shown diagrammatically in FIG. 2, it may also be mounted at the top of the hive, as diagrammatically shown in FIG. 3, or in the middle of the hive, as diagrammatically shown in FIG. 4, and operate effectively. The parts of the hives, including the addition of the pollen trap 22, may be readily interconnected by suitable means, such as the pin and socket arrangements (not shown).

To hold the parts together, a pivotally mounted latch (not shown) of the well-known type may be fastened to the outside surface of two adjacent parts of the hive.

Figure 5:
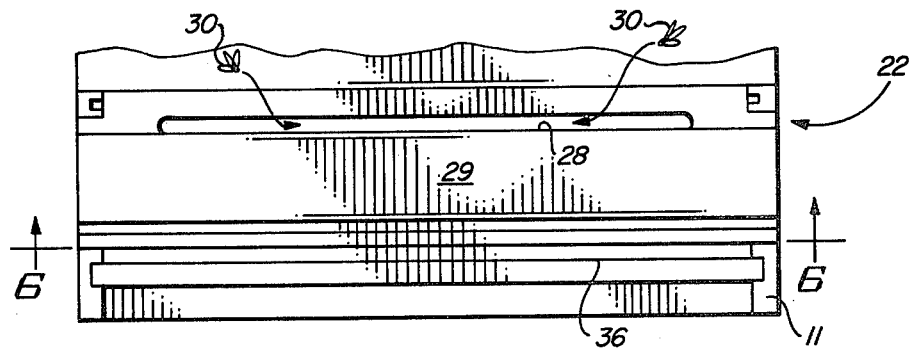
FIG. 5 is a front view of the novel pollen trap disclosed and embodying the invention.

FIGS. 5–7 disclose in more detail pollen trap 22 which may be positioned in any one of the three positions diagrammatically shown in FIGS. 2–4. This pollen trap comprises an open-ended, rectangular, box-like frame 23 having a rectangularly shaped drawer 24 slidably mounted on a pair of rails 24A, one of which is shown in FIG. 7, fastened to the sides 25 of frame 23 and arranged to extend into frame 23 from end 26 thereof through an opening 27. An entranceway 28 is provided above the plate or handle 29 of the drawer for the worker bees 30 to enter the pollen trap, as shown in FIG. 7, and extends laterally across the longitudinal axis of the drawer 24. It directs the bees upwardly through a passage 31 extending between a pair of spaced grating or offset screens 32 and 33 of predetermined size mesh and a lower screen 34. Screen 34 comprises a mesh smaller than the size of the worker bees and forms a barrier over the top of drawer 24.

It should be noted that a different diameter of screen 35 is used on the bottom of the pollen drawer and another screen 36 on the bottom of frame 23, as shown in FIG. 7.

When the humidity is dry and below 30–50%, relatively small mesh screens are used on the bottom of drawer 24 and frame 23 since air circulation is not necessary to dry out the pollen. When the humidity is above 80%, a wire mesh of a relatively larger size is used on the bottom of the pollen drawer to permit the maximum circulation of air and heat through the pollen to help remove the moisture and dry the pollen.

It is proposed that a screen having 7 squares to the inch formed from wire of a diameter 0.018 of an inch be used over the pollen drawer to allow the pollen to fall through into the pollen drawer and yet keep the bees out of the pollen drawer. The 8 squares to the inch screen heretofore used is such a small mesh that, in the times of pollen flows of large granules, they pile up on the corners of the wire and eventually create a solid mass of pollen up through the wire and theoretically could permit the colony to smother. Wire mesh of 6 squares to the inch is large enough so that bees penetrate the wire and enter the pollen drawer; yet the wire is small enough that the bees cannot then escape, but are left in the pollen drawer to eat the pollen and eventually die. Neither the 8 nor the 6 squares to the inch mesh is correct for the screens over the pollen drawer. Seven squares to the inch is ideal and serves and accomplishes both tasks of allowing the pollen to free flow into the pollen drawer, regardless of the size of the granules, and yet keeps all bees out of the pollen drawer.

This trap is unique in that the two layers of a screen, namely screens 32 and 33, having a mesh employing 5 squares to the inch of a 0.023 diameter wire, are offset or staggered horizontally both up and across. This staggering of the screens causes a 25% greater efficiency in trapping the pollen from the worker bees than heretofore accomplished.

It should be noted that by increasing the sizes of the wire to 0.028, 0.032, 0.037, 0.042 and 0.047 inches in diameter, still maintaining 5 squares per inch, the staggered horizontally arranged screens can still more effectively trap the pollen from the worker bees. This range of wire diameter sizes makes the openings smaller in the said third and fourth screens are formed of wire having a diameter of 0.028 inches.

9. The pollen trap set forth in claim 7 wherein:
said third and fourth screens are formed of wire having a diameter in the range of 0.028 to 0.047 inches.

10. A pollen trap for collecting pollen from bees as they enter a beehive comprising:
- a frame having an open top and dimensioned to fit as one of the axially positioned parts of a vertically stacked beehive,
- a drawer slidably arranged in said frame to assume a substantially horizontal position in the hive,
- said drawer having a bottom surface comprising a first screen, the mesh size of which is smaller than the pollen dropped thereon by the bees,
- a second screen mounted in said frame above said drawer and having a mesh size smaller than the size of the pollen carrying bees for prohibiting them from entering the drawer,
- a pair of parallel and spacedly arranged third and fourth screens mounted on said frame, but offset above said second screen and forming an elongated space between said second screen and said pair of screens,
- said third and fourth screens having mesh openings offset from each other causing bees crawling through said pair of screens to be forced to follow a circuitous path, divesting, their legs of a substantial portion of the pollen carried thereon,
- a first entranceway for the pollen carrying bees into the pollen trap positioned adjacent the front and above said drawer and connected with one end of said space between said second screen and said pair of screens,
- a second entranceway for the pollen carrying bees into the pollen trap positioned adjacent the front and below said drawer and connected with another end of said space between said second screen and said pair of screens, and
- third entranceway means for the pollen carrying bees into the pollen trap positioned in the back and two sides of the beehive below the drawer and connected with said space between said second screen and said pair of screens,
- whereby the bees may move through said pair of screens at points all along their lengths.

* * * * *

5 squares per inch without the need to resort to 6 squares per inch in the wire mesh configuration.

As indicated in FIG. 7, most of the bees enter the hive and the pollen trap through the entranceway 28 and move into and along a passageway 31 between grids or screens 32 and 34. At this point, the bees have to crawl through the opening in the grid or screen 32 and then crawl through the openings in the grid or screen 33 which are offset from the opening in screen 32. The function of the pollen traps is to force the incoming foraging bees with pollen pellets on their hind legs to twist their bodies through the opening in screens 32 and 33. In twisting through the grid formed by these screens, pollen pellets are scraped off of their legs and fall down through screen 34 into the pollen drawer 24 above screen 35 positioned at the bottom of the drawer.

In accordance with the teachings of this invention, a further entranceway 36 and passageway 37 are provided between frame 26 of the pollen trap 22 and the top of bottom board 11, as shown in FIG. 7. This entranceway, which has an opening extending across the end of the pollen trap immediately below drawer 24, directs the bees 30 to a space 38 behind drawer 24 and then over screen 34 into passageway 31. The bees then pass through screens 32 and 33 in the same manner as the bees entering the pollen trap 22 through entranceway 28.

With the dual entranceway and passageway shown, the bees can enter the hive above and below the drawer 24 without clustering to get in and then are directed to pass through the offset screens 32 and 33 of the grid from both ends thereof. Thus, the bees are spread out over more of the grid structure than heretofore possible with a single entranceway.

FIG. 8 illustrates that the entranceway 36 may be positioned to open from the back 26 of the beehive, i.e., from the side opposite to that provided for drawer 24, by merely reversing the bottom board 11. With this arrangement, the bees immediately enter space 38 from the entranceway 36 and do not have to travel the length of passageway 37, as is necessary with the structure shown in FIG. 7.

The pollen trap shown in FIGS. 5-7 is usually positioned at the bottom of a hive, as diagrammatically shown in FIG. 2, causing the worker bees to move across the top and bottom of drawer 24 from either the front or back of the pollen trap when the bees enter the pollen trap, thereby eliminating most of the entranceway pile up and clustering of the worker bees in front of the hive. As evident from FIG. 8, an exitway 39 is provided for the drone bees and the queen bee, if she chooses, in the back 26A of frame 26 since these bees are too large to enter and exit through the double five squares to the inch wire meshes 32 and 33 used by the worker bees.

In order to further expedite the entrance of the worker bees into the hive passing through the pollen trap, entranceways 36' may be provided in the back and two sides of the bottom board 11 between it and frame 26 of the pollen trap.

An improved pollen trap for beehives is thus disclosed in accordance with the stated objects of the invention; and although but a few embodiments of the invention have been illustrated and described, it will be apparent to those skilled in the art that various changes and modifications may be made therein without departing from the spirit of the invention or from the scope of the appended claims.

What is claimed is:
1. A pollen trap for collecting pollen from bees as they enter a beehive comprising:
   a frame having an open top and dimensioned to fit as one of the axially positioned parts of a vertically stacked beehive,
   a drawer slidably arranged in said frame to assume a substantially horizontal position in the hive,
   said drawer having a bottom surface comprising a first screen, the mesh size of which is smaller than the pollen dropped thereon by the bees,
   a second screen mounted in said frame above said drawer and having a mesh size smaller than the size of the pollen carrying bees for prohibiting them from entering the drawer,
   a pair of parallel and spacedly arranged third and fourth screens mounted on said frame, but offset above said second screen and forming an elongated space between said second screen and said pair of screens,
   said third and fourth screens having mesh openings offset from each other causing bees crawling through said pair of screens to be forced to follow a circuitous path, divesting their legs of a substantial portion of the pollen carried thereon,
   a first entranceway for the pollen carrying bees into the pollen trap positioned adjacent the front and above said drawer and connected with one end of said space between said second screen and said pair of screens, and
   a second entranceway for the pollen carrying bees into the pollen trap positioned adjacent the front and below said drawer and connected with another end of said space between said second screen and said pair of screens,
   whereby the bees may move through said pair of screens at points all along their lengths.
2. The pollen trap set forth in claim 1 wherein:
   said frame defines a cluster area behind said drawer for the pollen collecting bees, which cluster space interconnects said second entranceway and said another end of said space.
3. The pollen trap set forth in claim 2 in further combination with:
   a bottom board for supporting said pollen trap,
   said bottom board in combination with said frame forming a passageway from said second entranceway to the cluster area back of said drawer.
4. The pollen trap set forth in claim 2 wherein:
   said second entranceway is positioned at the end of said frame opposite to said drawer.
5. The pollen trap set forth in claim 2 in further combination with:
   a passageway connected to said second entranceway for directing bees entering therein to said cluster area,
   whereby bees entering said first and second entranceways move into said space between said second screen and said pair of screens from both ends of said drawer.
6. The pollen trap set forth in claim 1 wherein:
   said second screen comprises a mesh having seven square openings per inch.
7. The pollen trap set forth in claim 1 wherein:
   said third and fourth screens comprise a mesh having five square openings per square inch.
8. The pollen trap set forth in claim 7 wherein:

UNITED STATES PATENT OFFICE
CERTIFICATE OF CORRECTION

Patent No. 4,435,866  Dated March 13, 1984

Inventor(s) Royden Brown

It is certified that error appears in the above-identified patent and that said Letters Patent are hereby corrected as shown below:

In the title of the application, delete "PELLEN" and substitute ---POLLEN---.

*Signed and Sealed this*

*Twenty-second* Day of *May 1984*

[SEAL]

*Attest:*

GERALD J. MOSSINGHOFF

*Attesting Officer*  *Commissioner of Patents and Trademarks*